May 15, 1951 P. J. CAMPBELL 2,553,131
CONTROL FOR COOLING AIR EJECTORS
Filed Sept. 6, 1945
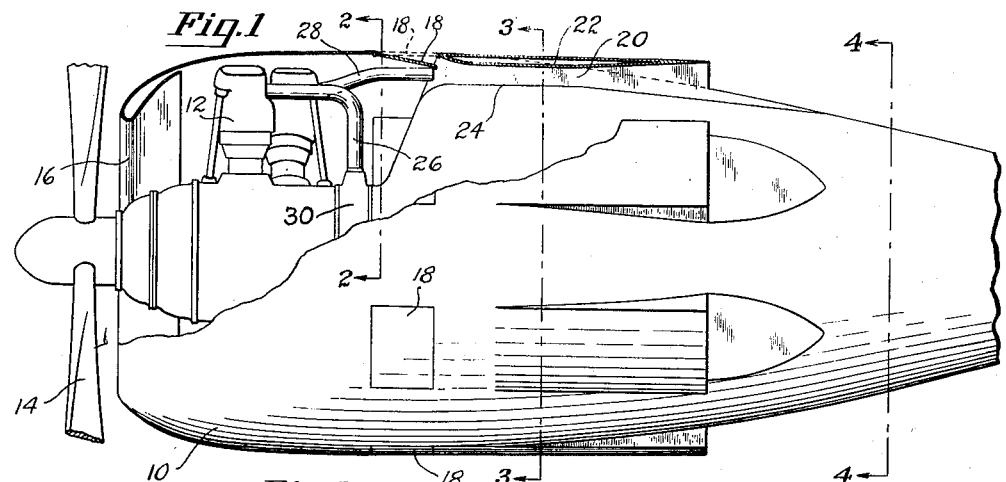
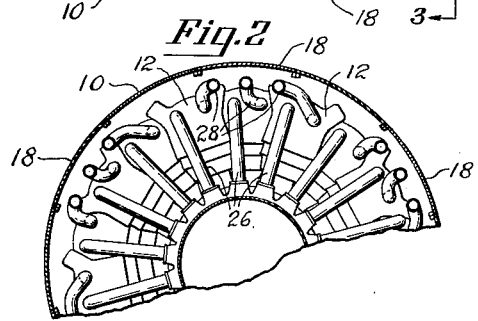
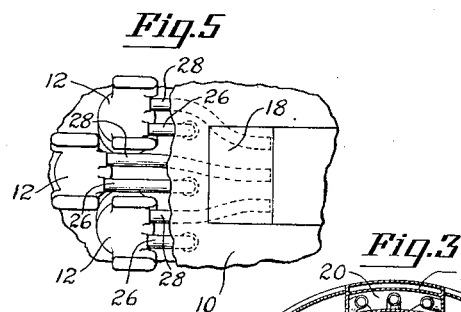
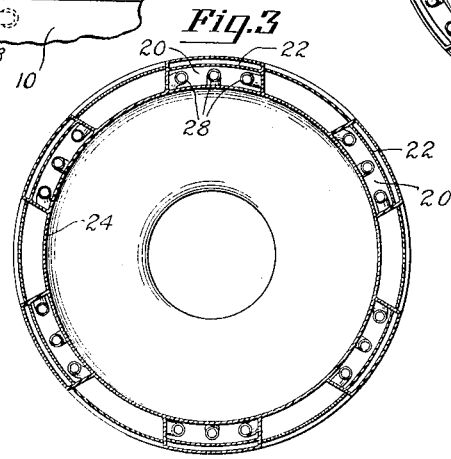
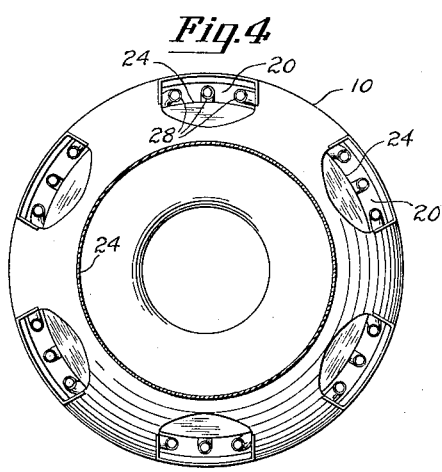
INVENTOR
Paul J. Campbell
BY H. Hume Mathews
ATTORNEY.

Patented May 15, 1951

2,553,131

UNITED STATES PATENT OFFICE 2,553,131

CONTROL FOR COOLING AIR EJECTORS

Paul J. Campbell, East Hartford, Conn., assignor to United Aircraft Corporation, East Hartford, Conn., a corporation of Delaware Application September 6, 1945, Serial No. 614,735

6 Claims. (Cl. 123—41.59)

This invention relates to aircraft cowls and particularly to an engine enclosing cowl having an improved form of exit duct and flap construction for the air passing through and from the cowl.

One of the principal objects of the present invention is to provide a cooling air exit construction for aircraft engine cowls adapted to be powered by the exhaust gases of an engine housed within the cowl.

Another object of the invention is to provide hinged flaps at the forward ends of the exit ducts movable from a streamlined closed position to inner or open positions also streamlined, each flap when in one of its open positions admitting more or less free air to the forward ends of separate exit ducts.

Another object of the invention is to provide cooling air exit ducts with their front ends positioned adjacent discharge nozzles for engine exhaust gases so that these gases will discharge directly into the ducts adjacent their forward ends and augment the mass flow of cooling air therethrough.

Other objects and advantages will be apparent from the specification and claims and from the drawing which illustrates what is now considered to be a preferred embodiment of the invention.

In the drawing:

Fig. 1 is a longitudinal view in elevation of a cowl construction made according to the present invention parts being broken away to more clearly show its construction.

Fig. 2 is a transverse sectional view taken on the plane of line 2—2 of Fig. 1.

Fig. 3 is a transverse sectional view taken on the plane of line 3—3 of Fig. 1.

Fig. 4 is a transverse sectional view taken on the plane of line 4—4 of Fig. 1, and Fig. 5 is a fragmentary plan view showing a group of exhaust gas discharge nozzles opening into a single cooling air exit duct.

In its preferred form, the invention may include the following principal parts: first, a generally cylindrical cowl having a streamlined forward end formed with a central air intake opening; second, spaced longitudinally extending exit ducts formed within the substantially cylindrical portions of the cowl; third, flaps hinged to the cowl at their forward ends adjacent the forward ends of the exit ducts, these flaps being movable from oblique positions extending inwardly and admitting free air to the forward ends of the ducts to closed streamlined positions lying substantially contiguous with the outer cylindrical surface of the cowl; and fourth, means to discharge engine exhaust gases rearwardly into the forward ends of said exit ducts.

During operation of aircraft engines at maximum load and relatively low speeds of the plane as during climbing, it is advantageous to induce the greatest mass flow of cooling air through the cowl. This in accomplished in the present instance by admitting engine exhaust gases at high velocity into the forward ends of cooling air ejector ducts to augment the flow of cooling air through the cowl and from the ducts. At high air speeds, however, the flow of cooling air through the cowl is augmented substantially by the increased aircraft speed; therefore in order to reduce the drag as much as possible, the flow of cooling air should be limited. To accomplish this, the flaps are opened to admit free air to the ducts at their forward ends. The exit flaps in their outer or closed positions extend parallelly to the cowl axis and prevent intake of free air to the forward ends of the ejector ducts. The cooling air from within the cowl mingles with the free air and exhaust gases at the forward ends of the ducts. Thus mingled, these gases and air pass through the ducts which are of the expanding type as indicated in Fig. 1 and exit from the downstream ends of the ducts.

Referring more in detail to the figures of the drawings, it will be seen that there has been provided a generally cylindrical cowl 10 within which is centrally and longitudinally mounted a multi-cylinder, internal combustion aircraft engine 12 drivingly connected to a propeller 14 at its forward end. The cowl 10 at its forward end is streamlined as shown and preferably is provided with a central opening 16 for the intake of cooling air. At a central longitudinal position of said cowl are provided spaced flaps 18 hinged along their forward edges and adapted for movement from a streamlined outer or closed position indicated in broken lines in Fig. 1 substantially contiguous with the cylindrical surface of the cowl 10 to oblique angular streamlined positions extending inwardly from the cylindrical surface of the cowl.

Rearward of the hinged flaps 18 are elongated longitudinally extending exit ducts 20, their outer surfaces lying within or forming part of the cylindrical surface of the cowl 10. These ducts form an annular series of exit passages for the cooling air disposed between the surfaces of the cowl and nacelle or fuselage. Each duct is preferably provided with a longitudinally extending sheet metal insert 22 so designed and positioned as to aid in giving the duct the proper increasing area as it approaches its exit or downstream opening to give it the desired expansion qualities. The inner surface of the ducts 20 is formed by portions of the surface of the nacelle 24 enclosed by the cowl 10.

As will be seen in Fig. 1, the engine 12 mounted within the cowl 10 is provided with intake and exhaust conduits 26 and 28 respectively of usual or conventional type. The conduits 28 may be individual exhaust stacks for the engine cylinders grouped by threes into the ducts 20 at or adjacent their forward ends. The fuel and air intake conduits 26 extend from a supercharger section 30 to the individual cylinder heads of the engine 12 and the exhaust stacks or pipes 28 extend individually from these heads so that their outer or free ends form nozzles disposed substantially at the forward opening of the exit slots 20 and adjacent the trailing edges of the flaps 18. By means of these conduits 28 and their nozzles, the engine exhaust gases are discharged into and through the slots 20 and augment the flow of cooling air through and from the cowl.

The slots 20 formed as above described and with the flaps 18 in a closed position operate as ejector mixing sections to pump cooling air through the cowl during climbing, the momentum of the exhaust gases discharged into the forward ends of the slots 20 serving to increase the mass flow of cooling air from the cowl and through the slots.

Preferably, and as shown in the figures of the drawing, groups of exhaust gas conduits 28 and their nozzles extend parallelly of and extend directly into the front end of each exit slot 20.

It will be seen from the above-described construction that with the flaps 18 in their outer streamlined or closed position as shown in broken lines in Fig. 1, the effect of the exhaust gases forced into the forward ends of the exit slots 20 will be to act to power an ejector built into the cowl or fuselage surface to augment the flow of cooling air through the cowl. This outer streamlined or closed position of the flaps 18 gives maximum air flow through the cowl and maximum cooling effect to the engine. This position of the flaps 18, as stated above, is adapted for heavy duty conditions of the aircraft engine at relatively low air speeds, as during climbing. In the inner or open positions of these flaps 18, as shown in full lines in Fig. 1, different amounts of air from the air-stream immediately surrounding the cowl will be admitted to the forward end of the exit slots 20 simultaneously with the admission of the exhaust gases from conduits 28 and at substantially the same positions. The open positions of the flaps 18 materially reduce the drag of the cowl and give regulatable and ample cooling effect for normal or intermediate power operation of the engine when the air speed of the aircraft is relatively high. Large variable amounts of free air will be admitted to the exhaust slots by adjustment of the flaps 18 to mingle with the exhaust gases and cooling air so that the mingled gases may pass together through the slots.

The open or partially open flaps 18 decrease the drag of the cowl 10 at high speeds by reducing the flow of cooling air over the engine 12, and by substituting in its place in a portion of the ejector a stream of higher velocity air.

When the flaps 18 are in different open positions, the ejector ducts 20 are partly filled with the streams of air entering through the flaps 18, a portion of each ejector duct 20 is thereby prevented from pumping cooling air. Since the passage of air from the outside of the cowl 10 through the flaps 18 is relatively free from obstructions, the stream of air entering the flaps 18 will retain a high velocity, and the mean velocity of the mixture of exhaust gas and air leaving the ejector ducts 20 will be relatively high, thereby reducing the drag of the nacelle.

Any preferred means may be employed to move the flaps 18 from their closed or streamlined positions into different oblique positions to admit variable amounts of free stream to the exit slots. As these means form no part of the present invention, they have not been shown in the drawings.

Manual means to actuate the flaps 18 may be provided extending to the cockpit by suitable connections. Or, automatic actuating means as shown in Nissen Re-issue Patent No. 21,312 originally granted May 25, 1937, may be provided enabling the positions of the flaps to be controlled by temperature variations within the cowl.

It is to be understood that the invention is not limited to the specific embodiment herein illustrated and described but may be used in other ways without departing from the spirit of the invention as defined by the following claims.

I claim:

1. In combination, a cowl having an air intake opening, an exit duct for air passing from said cowl, an engine within said cowl, a second opening for admitting air to said duct, a flap covering said second opening, said flap being hinged at its forward edge, an engine exhaust nozzle for discharging exhaust gas from said engine into said exit duct, said nozzle having its discharge end adjacent the intake end of said exit duct, and said flap having its rearward opening end located downstream of the discharge end of said nozzle.

2. In combination, a cowl having an air intake opening, an engine in said cowl, spaced exit ducts for air passing from said cowl, said cowl having openings adjacent the forward ends of said ducts, a flap hinged at the forward end of each opening, each of said flaps being movable from a streamlined position closing its opening into positions to admit air from the airstream outside of said cowl through its opening to the forward end of the adjacent duct, and engine exhaust nozzles extending to the forward ends of said ducts for discharging exhaust gases into the ducts.

3. In combination, an engine, an engine enclosing cowl having an air intake opening, spaced exit ducts for exhausting air from said cowl, said cowl having an opening located adjacent the entrance of each exit duct, a flap for each last named opening for regulating its effective area, said flaps being movable from a position closing their openings to oblique inner positions admitting air from the airstream outside of said cowl through the second named openings to the forward end of said slots, and an engine exhaust nozzle for discharging a fluid jet into the entrance of each exit duct, each nozzle also having its exit point adjacent the trailing edge of a flap.

4. In combination, an engine, an engine enclosing cowl having an air intake opening, an exit duct for exhausting air from said cowl, said cowl having a second opening located adjacent the entrance of said exit duct, a flap for said second opening for regulating its effective area, said flap being movable from a position closing its opening to oblique inner positions admitting air from the airstream outside of said cowl through the second named opening to the forward end of said duct, and an engine exhaust nozzle for discharging a fluid jet into the entrance of said exit duct, said nozzle also having its exit point adjacent the trailing edge of said flap.

5. In combination, an engine, an engine enclosing cowl having an air intake opening, an elongated venturi shaped exit duct within the periphery of said cowl, said cowl having an opening adjacent the forward end of said duct, a flap for regulating the effective area of the second named opening, said flap being hinged at its forward edge and movable from a closed position to oblique inner positions to admit air from the airstream through the second named opening to the forward end of said duct, and a nozzle for discharging a fluid jet having its discharge end located adjacent the forward end of said duct and trailing edge of said flap.

6. In combination, a cowl having an air intake opening, an exit duct for air passing from said cowl, an engine within said cowl, a second opening for admitting air to said duct, a flap covering said second opening, said flap being hinged at its forward edge, an engine exhaust nozzle for discharging exhaust gas from said engine into said exit duct, said nozzle having its discharge end adjacent the intake end of said exit duct, and said flap having its rearward opening end located adjacent the discharge end of said nozzle.

PAUL J. CAMPBELL.

REFERENCES CITED

The following references are of record in the file of this patent:

UNITED STATES PATENTS

| Number | Name | Date |
|---|---|---|
| 1,802,915 | Hicks | Apr. 28, 1931 |
| 1,825,794 | Hewitt | Oct. 6, 1931 |
| 2,146,523 | Bleecker et al. | Feb. 7, 1939 |
| 2,177,642 | Fellers | Oct. 31, 1939 |
| 2,178,960 | Gagg | Nov. 7, 1939 |
| 2,228,637 | Mercier | Jan. 14, 1941 |
| 2,241,954 | Mercier | May 13, 1941 |
| 2,244,594 | Amiot | June 3, 1941 |

FOREIGN PATENTS

| Number | Country | Date |
|---|---|---|
| 406,713 | Great Britain | Dec. 17, 1935 |
| 505,938 | Great Britain | May 19, 1939 |
| 874,614 | France | May 11, 1942 |

OTHER REFERENCES

Serial No. 296,469, Schnetzer (A. P. C.), published May 11, 1943.

Serial No. 326,141, Ramshorn (A. P. C.), published May 11, 1943.